(12) United States Patent
Brown et al.

(10) Patent No.: US 7,088,719 B2
(45) Date of Patent: Aug. 8, 2006

(54) PROCESSOR WITH PACKET PROCESSING ORDER MAINTENANCE BASED ON PACKET FLOW IDENTIFIERS

(75) Inventors: David Allen Brown, Austin, TX (US); Mauricio Calle, Austin, TX (US); Abraham Prasad, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 854 days.

(21) Appl. No.: 10/032,025

(22) Filed: Dec. 21, 2001

(65) Prior Publication Data

US 2003/0118023 A1    Jun. 26, 2003

(51) Int. Cl.
*H04L 12/28* (2006.01)
*H04L 12/56* (2006.01)

(52) U.S. Cl. ............... 370/394; 370/395.3; 370/235

(58) Field of Classification Search .......... 370/229, 370/230, 235, 394, 395.3, 395.4, 395.41, 370/395.42; 709/223, 245
See application file for complete search history.

(56) References Cited

U.S. PATENT DOCUMENTS

| | | | | |
|---|---|---|---|---|
| 4,761,733 A | * | 8/1988 | McCrocklin et al. | 711/212 |
| 6,381,242 B1 | * | 4/2002 | Maher et al. | 370/394 |
| 6,765,909 B1 | * | 7/2004 | Sen et al. | 370/392 |
| 2002/0087709 A1 | * | 7/2002 | Kerr et al. | 709/231 |
| 2002/0143948 A1 | * | 10/2002 | Maher et al. | 709/226 |
| 2003/0061269 A1 | * | 3/2003 | Hathaway et al. | 709/202 |

FOREIGN PATENT DOCUMENTS

| | | |
|---|---|---|
| EP | 1 061 695 A2 | 12/2000 |
| WO | WO 99/07180 | 2/1999 |
| WO | WO 01/05086 A2 | 1/2001 |
| WO | WO 01/16682 A1 | 3/2001 |
| WO | WO 01/50679 A2 | 7/2001 |

* cited by examiner

*Primary Examiner*—Chirag Shah

(57) ABSTRACT

A processor having a packet processing order maintenance feature includes classification circuitry operative to identify for each of a plurality of packets received in the processor a corresponding packet flow identifier, control circuitry operatively coupled to the classification circuitry, and at least one operational unit operatively coupled to the control circuitry. The control circuitry is operative to direct one or more packets having a given packet flow identifier to the operational unit(s) in a manner that maintains a desired function call sequencing over the one or more packets having the given packet flow identifier for one or more order-dependent processing tasks in the processor.

18 Claims, 4 Drawing Sheets

PROCESSOR WITH PACKET PROCESSING ORDER MAINTENANCE BASED ON PACKET FLOW IDENTIFIERS

FIELD OF THE INVENTION

The present invention relates generally to packet processing systems, and more particularly to a network processor or other type of processor configured for use in performing packet routing, packet switching and other packet processing operations within such a system.

BACKGROUND OF THE INVENTION

A network processor generally controls the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

In a network processor, it is important to maintain an appropriate processing order for incoming or outgoing packets. For example, many of the processing tasks in a network processor are order-dependent tasks in that the result of a given operation is required for the correct execution of a subsequent operation. Such operations are typically initiated by function calls to one or more operational units of the processor. A given operational unit may include multiple execution units, each capable of executing operations for the operational unit. An example of one type of operational unit is a computational unit that performs particular computational operations in response to requests for such operations.

Conventional techniques for maintaining a desired function call sequencing in a network processor include serialization of function call dispatch, or a scalar approach involving a single execution unit.

In the serialization approach, function calls to different operational units are dispatched in a serial manner in accordance with a specified function call sequencing. In other words, an appropriate function call sequence is determined, and the function calls are dispatched in a serial manner so as to maintain the desired sequence. A function call that requires a result from another function call simply waits until the result is available before being dispatched to a particular operational unit. This approach maintains some of the advantages of parallelism through the use of multiple operational units, but fails to fully exploit such parallelism in increasing network processor throughput.

The scalar approach circumvents the issue of maintaining a proper processing sequence altogether by utilizing only a single operational unit. While this approach does ensure a proper processing sequence, it severely restricts the throughput of the network processor by eliminating any gains attributable to parallelism.

Thus, both of the conventional approaches described above are deficient in that they fail to provide maximum network processor throughput. These deficiencies become increasingly apparent at high data rates, e.g., data rates at or above 2.5 Gigabits per second (Gbps).

A need therefore exists for improved techniques for maintaining a desired function call sequence for order-dependent processing tasks in a network processor or other type of processor, in a manner which increases processor throughput by more efficiently exploiting parallelism between operational units of the processor.

SUMMARY OF THE INVENTION

The invention provides improved techniques for maintaining a desired function call sequence for the processing of packets in a network processor or other processor comprising one or more operational units.

In accordance with one aspect of the invention, a processor having a packet processing order maintenance feature includes classification circuitry operative to identify for each of a plurality of packets received in the processor a corresponding packet flow identifier, control circuitry operatively coupled to the classification circuitry, and at least one operational unit operatively coupled to the control circuitry. The control circuitry is operative to direct one or more packets having a given packet flow identifier to the operational unit(s) in a manner that maintains a desired function call sequencing over the one or more packets having the given packet flow identifier for one or more order-dependent processing tasks in the processor.

In accordance with another aspect of the invention, one or more of the packet flow identifiers each translates to a unique memory location in memory circuitry associated with the processor. The unique memory location corresponding to a given packet flow identifier stores at least a counter specifying a number of functions performed for an associated packet flow.

In accordance with a further aspect of the invention, each of the received packets has a context identifier assigned thereto within the processor prior to function call issuance for that packet. The context identifiers may be selected from a fixed number of tokens, e.g., 256 tokens, such that the context identifier comprises an 8-bit identifier. The context identifiers assigned to the received packets are utilized to maintain the desired function call sequencing for the received packets associated with a particular packet flow identifier.

Advantageously, the invention can improve processor throughput by better exploiting the parallelism available through use of multiple operational units of the processor.

DETAILED DESCRIPTION OF THE INVENTION

The invention will be illustrated herein in conjunction with an exemplary packet processing system which includes a network processor configured in a particular manner. It should be understood, however, that the invention is more generally applicable to any processor in which it is desirable to maintain a particular packet processing order in one or more operational units of the processor.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions and combinations of these and other devices.

The term "classification circuitry" as used herein is intended to include any portion of a processor or other type of processing circuitry which is capable of performing at least a portion of at least one classification operation on a packet or a portion of a packet. Examples of classification operations include, without limitation, preclassification, reassembly, prioritization, statistics gathering, scheduling, traffic management, etc. As a more particular example, an illustrative embodiment of the invention to be described below includes first classification circuitry, e.g., a preclassifier or other first pass classifier, configured to perform a first pass classification, and second classification circuitry, e.g., a second pass classifier, configured to perform a second pass classification. The first pass classification in this embodiment generally includes at least a portion of a packet reassembly operation, and the second pass classification in this embodiment generally includes at least a portion of a scheduling or traffic management operation. The first and second classification circuitry may each represent, e.g., one or more separate classification engines, different portions of a single classification engine, or other arrangements of circuitry configured to provide at least a portion of the processing operations described herein.

The present invention in an illustrative embodiment improves processor throughput in a packet processing system by utilizing packet flow identifiers to maintain packet processing order in one or more operational units of the processor.

Figure 1:
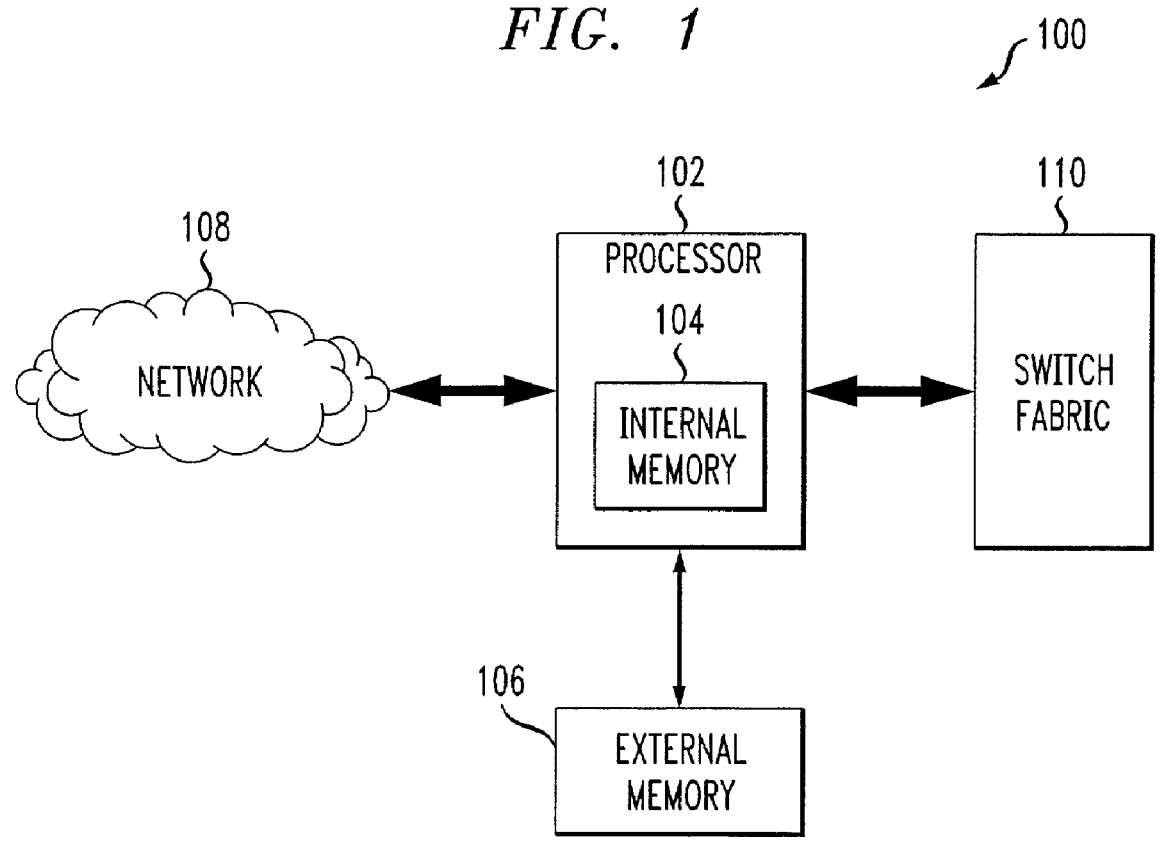
FIG. 1 is a simplified block diagram of an illustrative embodiment of a packet processing system in which the present invention is implemented.

FIG. 1 shows a packet processing system 100 in which the invention is implemented. The system 100 includes a network processor 102 having an internal memory 104. The network processor 102 is coupled to an external memory 106 as shown, and is configured to provide an interface for communicating cells, packets or other packet data between a network 108 and a switch fabric 110. The processor 102 and its associated external memory 106 may be implemented, e.g., as one or more integrated circuits installed on a line card or port card of a router or switch. In such a configuration, the switch fabric 110 is generally considered to be a part of the router or switch.

It should be understood that the particular arrangement of system elements shown in FIG. 1 is by way of illustrative example only. More particularly, as previously noted, the invention can be implemented in any type of packet processor, and is not limited to any particular packet processing application.

Figure 2:
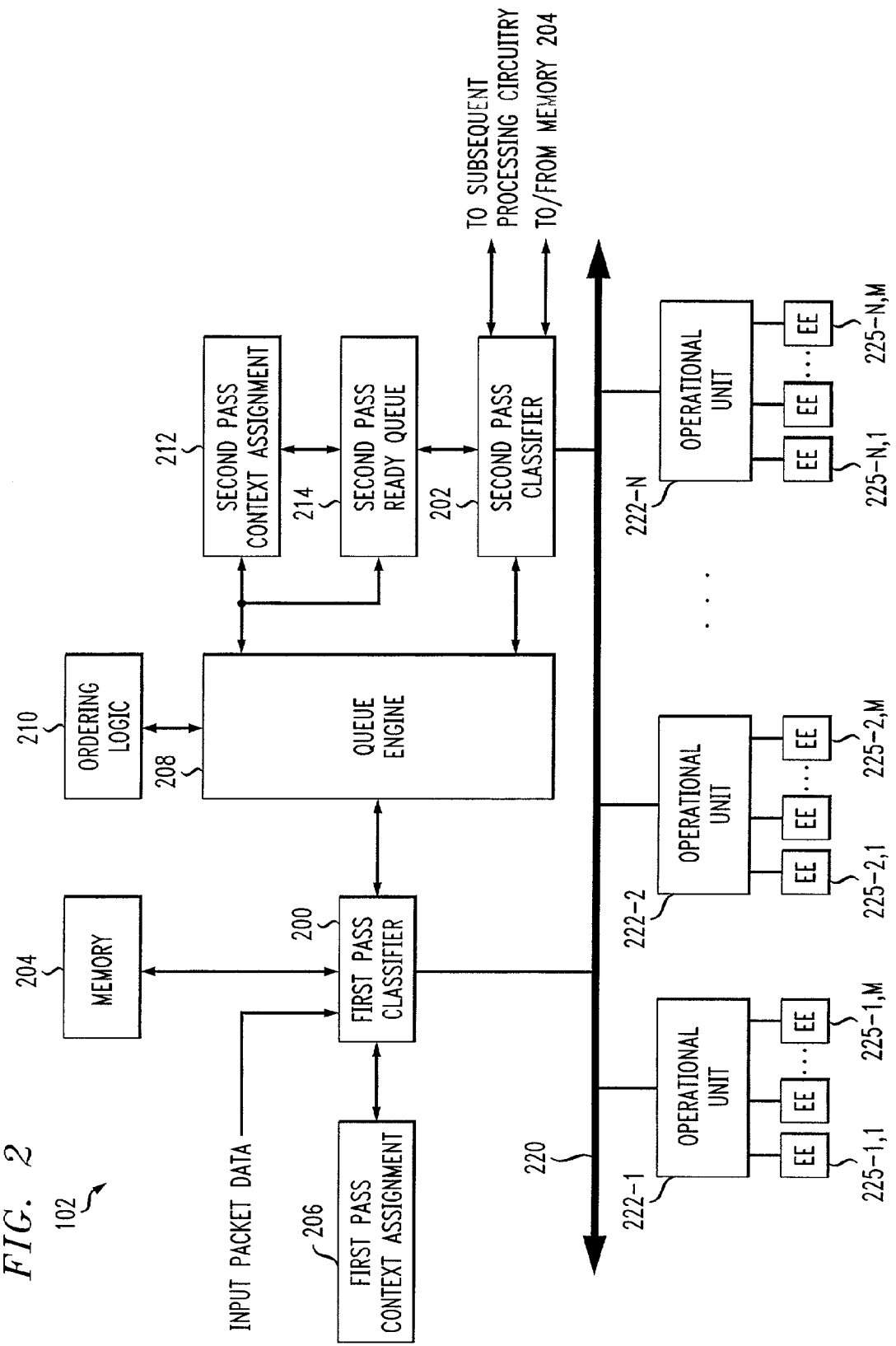
FIG. 2 is a more detailed view of a network processor of the FIG. 1 system configured in accordance with the techniques of the invention.

FIG. 2 shows the network processor 102 of FIG. 1 in greater detail. The network processor 102 in this embodiment includes a first pass classifier 200 which receives incoming packet data from the network 108 or the switch fabric 110. The first pass classifier 200 is coupled to a memory 204 and a second pass classifier 202. The memory 204 may comprise at least a portion of the internal memory 104, the external memory 106, or both. Second pass classifier 202 is also coupled to the memory 204. An output of the second pass classifier 202 goes to subsequent processing circuitry which may include, e.g., scheduling circuitry, queuing circuitry, dispatch circuitry, etc.

The network processor further includes a first pass context assignment element 206, a queue engine 208, ordering logic 210, a second pass context assignment element 212, and a second pass ready queue 214. At least the first pass classifier 200 and the second pass classifier 202 are coupled to a functional bus 220 which provides an interface between these elements and N operational units 222-1, 222-2, ... 222-N. Each of the operational units 222-$i$, where $i=1, 2, \ldots$ N, has associated therewith in this illustrative embodiment a number of execution engines (EEs) 225-$i,j$, where $j=1, 2, \ldots$ M. The operational units 222-$i$ may be computational units which perform computations in their associated execution engines for the first and second pass classifiers. Other elements of the network processor 102 may be coupled to the functional bus 220 in other embodiments of the invention.

The first pass classifier 200 of FIG. 2 may be implemented as, e.g., a preclassifier which performs at least one of a reassembly operation, a parity check and a priority determination for a given packet, while the second pass classifier 202 is implemented as, e.g., one or more classification engines which perform at least one of a scheduling operation, a queuing operation and a dispatch operation. It is also possible that one or both of the classifiers 200, 202 may implement statistics gathering operations for use in scheduling and other traffic management functions such as policing. These and other operations of the classifiers 200, 202 may be implemented in a conventional manner using techniques well-known in the art, and are therefore not described in detail herein.

The packet data received by first pass classifier 200 may comprise cells or other portions of the given packet that are to be reassembled to form the given packet using reassembly circuitry that may be incorporated into or otherwise associated with the first pass classifier 200. The term "packet" as used herein is therefore intended to include not only a reassembled packet but also one or more cells or other packet data which when reassembled will form a packet.

Also, as indicated previously, different portions of the memory 204 may be implemented as separate memories, e.g., as portions of both the internal memory 104 and external memory 106 of FIG. 1, rather than as a single memory as shown in FIG. 2. The term "memory circuitry" as used herein is intended to include a separate memory as well as a particular portion of a larger memory, and may refer to internal memory, external memory or combinations thereof.

It is to be understood that the network processor 102 as shown in FIG. 2 is simplified for purposes of illustration, and in a given embodiment may include additional circuitry, such as the scheduling circuitry, dispatch circuitry and queuing circuitry noted above, one or more memory controllers, as well as appropriate interface circuitry for interfacing with the network 108, the switch fabric 110, and other external devices, such as an associated host processor. In addition, the particular connections between the processor elements are exemplary only, e.g., connections shown as bidirectional may be unidirectional, connections shown as directionless may be bidirectional or unidirectional, other connections not specifically shown may be made, etc.

Although the FIG. 2 embodiment includes multiple operational units 222, the invention can be implemented in an embodiment which includes only a single operational unit. In addition, the particular number of execution engines 225 associated with a given operational unit may vary from unit to unit, rather than being the same for each unit as in the FIG. 2 embodiment. Moreover, although the execution engines are illustrated in FIG. 2 as being external to their associated operational units, they may also be incorporated into their associated operational units.

Figure 3:
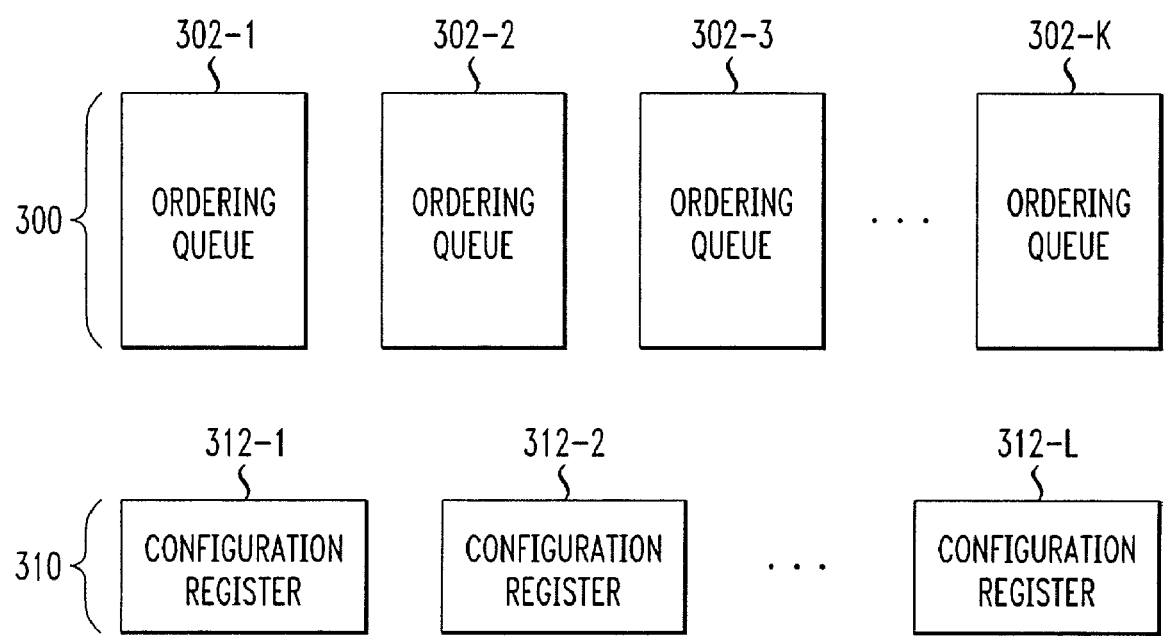
FIG. 3 illustrates ordering queues and configuration register elements of the ordering logic in the FIG. 2 processor, in accordance with the invention.

FIG. 3 illustrates a portion of the ordering logic 210 of the FIG. 2 network processor 102. In the illustrative embodiment, the ordering logic includes a set of ordering queues 300 comprising K separate queues 302-1, 302-2, . . . 302-K, each of the queues being used for ordering a different function set on a given processing pass. A suitable value for K in the illustrative embodiment is four, which would allow four different sets of functions to be ordered. By way of example, if a given function is to be ordered for both the first and second pass classifications, two of the four ordering queues could be utilized to provide this ordering.

The ordering logic further includes a set of configuration registers 310 comprising L separate configuration registers 312-1, 312-2, . . . 312-L, the set of configuration registers being used to control selection of which of a number of functions performable by the execution engines 225 of the operational units 222 can be ordered within the network processor 102. The sets of functions that are ordered using the ordering queues 300 are therefore selected from the functions specified in the configuration registers 310. There may be two or more of the configuration registers 312 for each of the ordering queues 302, e.g., if there are four of the ordering queues, an appropriate number of the configuration registers is eight. The particular number of ordering queues and configuration registers is of course implementation specific, and will vary depending upon factors such as how many bits are needed to specify a function and how many bits are in each of the configuration registers.

Particular functions that may be performed in a network processor such as processor 102 are well-known in the art and therefore not described in detail herein. The invention is not limited in terms of the particular functions to be performed, but is more generally suitable for use in maintaining a desired function call sequencing over one or more packets for one or more order-dependent processing tasks in the processor. Each of the order-dependent processing tasks will typically require the performance of multiple functions, and will thereby involve multiple function calls to the operational units 222 and their associated execution engines 225. In general, any function associated with the processing of packet data and that may be issued for dispatch over the functional bus 220 can be ordered using the techniques of the invention.

It should be noted that at least a portion of the ordering logic 210 of FIG. 3 may be implemented within the memory 204, e.g., the ordering queue set 300 and the configuration register set 310 may each be implemented as particular memory locations within the memory 204 of processor 102.

The operation of the network processor 102 will now be described with reference to a particular illustrative embodiment involving the processing of cells which are reassembled by the first pass classifier 200 into packets, also referred to herein as protocol data units (PDUs). The first pass classifier in this embodiment is configured to determine for each packet a corresponding packet flow identifier. The packet flow identifiers can be extracted from the headers of the cells, in a manner well-known in the art.

One or more of the packet flow identifiers may each translate to a unique memory location in memory 204 or other memory circuitry associated with the network processor 102. The unique memory location corresponding to a given packet flow identifier may be configured to store at least a counter specifying a number of functions performed for an associated packet flow. Other information relating to the processing of the given packet flow may also be stored in the unique memory location.

The above-noted counter may be used to count the number of ordered functions per context and per set of ordered functions. The resulting counts can then be used to facilitate ordering of a function issued multiple times in the life of a context. For example, it may be desirable during processing to delay function calls for one or more later packets until an earlier packet has issued at least a certain specified minimum number of function calls, so as to prevent the later packets from getting too far ahead of the earlier packet.

Control circuitry of the network processor 102, which in this embodiment may be viewed as comprising one or more of elements 206, 208, 210, 212 and 214 of FIG. 2, is operative to direct one or more packets having a given packet flow identifier to the appropriate operational unit(s) 222 in an advantageous manner that maintains a desired function call sequencing over multiple packets having the given packet flow identifier, for one or more order-dependent processing tasks in the processor. The term "control circuitry" should be construed as encompassing any arrangement of processing elements able to provide packet direction based on packet flow identifiers in a manner that maintains a desired function call sequencing in the processor 102, and should therefore not be construed as requiring the particular arrangement of elements 206, 208, 210, 212 and 214 shown in FIG. 2.

This processing order maintenance feature of the present invention in the illustrative embodiment can be used to guarantee that calls to certain predefined functions or sets of functions on either the first pass or second pass contexts or both will be presented on the functional bus 220 in an appropriate order. For first pass contexts, this means that the function calls will be presented on the functional bus 220 in the same order that the corresponding cells were assigned first pass context identifiers by the first pass context assignment element 206. This corresponds to the order in which the cells arrived "on the wire" at an input of the network processor 102, and the maintenance of this order for the associated function calls is referred to herein as context wire ordering. For second pass contexts, the function calls will be presented on the functional bus 220 in the same order that second pass context identifiers are assigned by the second pass context assignment element 212. This corresponds to an order in which the PDUs are ordered in the second pass ready queue 214 for delivery to the second pass classifier 202.

The first pass context identifiers are assigned by element 206 in numerical order in this illustrative embodiment, as cells arrive at the first pass classifier 200. The assignment in numerical order is not a requirement of the invention. In general, the first pass context identifiers could be assigned in a different order, with appropriate circuitry being used to keep track of the assignment order. Context identifiers may also be referred to herein simply as "contexts," and examples include numerical identifiers such as context 0, context 1, context 2, etc.

The context identifiers are preferably selected from a fixed number of tokens. For example, if the fixed number of tokens is 256, the context identifier can be an 8-bit identifier. Cells having the same packet flow identifier will thus have different context identifiers assigned thereto by the element 206, and these context identifiers can be utilized in the queue engine 208 and ordering logic 210 to enforce a context wire ordering among the cells of a particular packet flow identifier. The queue engine 208 releases the assigned first pass contexts in numerical order, and element 206 reassigns them in numerical order, which enforces the desired function call sequencing, i.e., in accordance with the context wire ordering.

After first pass classification is completed for a given PDU, the queue engine 208 receives the PDU from the first pass classifier 200, and places the PDU in the second pass ready queue 214. The PDUs are delivered to the second pass classifier 202 in accordance with their ordering in the second pass ready queue 214. When a given PDU is delivered from the second pass ready queue 214 to the second pass classifier 202, the second pass context assignment element 212 assigns a second pass context identifier to the PDU. The second pass context identifiers assigned to PDUs may be out of numerical order. The queue engine 208 keeps a list of free second pass context identifiers and assigns them to PDUs as the PDUs begin second pass classification. The ordering logic 210 keeps track of the order in which second pass contexts are issued and enforces the ordered functions based on this ordering.

The context assignment elements 206, 212 of FIG. 2, although shown as separate elements in the figure, may be incorporated into related elements of the network processor 102. For example, first pass context assignment element 206 may be incorporated into the first pass classifier circuitry or related control circuitry, and the second pass context assignment element 212 may be incorporated in the queue engine 208 or the ordering logic 210.

As indicated previously, it is possible for a set of functions to be grouped together for ordering, using the set of ordering queues 300 of FIG. 3. For example, each of the ordering queues 302 in the set 300 may be used to order four functions, such that a given ordered function set fSet may be formed as follows:

$$fSet=fOne+fTwo+fThree+fFour,$$

where fOne, fTwo, fThree and fFour are independent functions. In general, any function that is issued that belongs to a function set of an ordered queue is ordered in that queue. It should be noted that the use of four functions in the above example is merely illustrative. The invention does not require any particular limitation on the number of functions in a function set.

Functions can be programmably chosen to be ordered within first pass contexts or second pass contexts or both. If a function needs to be ordered in both first pass and second pass contexts, then it will use up two of the function ordering queues 302. It should be noted that there is no ordering between first and second pass contexts in the illustrative embodiment described above. Instead, a given function is ordered within first pass processing if the processor 102 is configured to do so, and the given function is ordered within second pass processing if the processor 102 is configured to do so. This is not a requirement of the invention, however, and the techniques described can be used to order multiple contexts, e.g., to order for both first pass and second pass processing.

It is also possible for the same function call to be issued more than once in the life of a context. The ordering logic 210 in the illustrative embodiment only orders the first issue of the function. Subsequent calls to the same ordered function before the termination of the context are not ordered, and are instead sent out on the functional bus 220 as soon as they are issued, regardless of order. Again, this is not a requirement of the invention, and the techniques described can be used to order a function multiple times before the termination of a context.

If the ordering logic 210 detects the termination of a context while waiting for an ordered function for that context, it stops waiting for the ordered function on that context and releases contexts that are "behind" it in an ordering sense. Basically, the ordering logic enforces ordering of functions presented on the functional bus 220 to match the order in which the contexts were begun. If a context is terminated before an ordered function is received on that context, the ordering logic determines that no ordered function will be issued for that context and stops waiting for one.

A particular function, e.g., a function illustratively denoted herein as fUnblockOrderQueues, may be used to direct the ordering logic 210 to unblock the ordering queues 302 for the context that issues the function. Once a context issues the fUnblockOrderQueues function, no other function for that context will be ordered until the context is terminated and reissued.

For functions that are defined to be ordered for second pass contexts, the ordering logic 210 may be configured such that priority level is not taken into account when performing ordering. This may be done to simplify the hardware design. However, it will mean that a lower priority PDU will block a higher priority PDU if the lower priority PDU was started before the higher priority PDU.

The functions to be ordered may be specified using techniques other than the configuration register control described in conjunction with the configuration register set 310 of FIG. 3. For example, a set of functions to be ordered may be defined as a specific function space, e.g., an upper function space corresponding to, e.g., functions 511–256, may be mapped to a lower function space, e.g., functions 255–0, and the mapped functions ordered. In general, the use of the configuration register approach is preferred in that it does not impact future assignment of functions.

Even within the general context of the above-described configuration register approach, other techniques may be used to specify functions to be ordered in a function set. For example, every function exhibiting a particular bit pattern, such as having its last three bits set to 001, could be assigned to a set through the use of masking.

The operation of the ordering logic 210 will now be described in greater detail with reference to a number of examples. It should be understood that the examples given below are for purposes of illustration only, and should therefore not be construed as limiting the scope of the invention in any way. Other embodiments of the invention may operate in a manner other than that described below. Assume for these examples that there are four separate ordering queues 302-1, 302-2, 302-3 and 302-4 in the set of ordering queues 300. The ordering queues enforce ordering within a particular queue, that is, for a given function or function set, but not between different queues. For example, suppose the following functions are issued in the following order from the first pass classifier 200 or the second pass classifier 202, and that context 0 was assigned before context 1:

ordered function 1 on context 1
ordered function 1 on context 0
ordered function 2 on context 0
ordered function 2 on context 1

The ordering logic 210 is configured to ensure that ordered function 1 would be issued on the functional bus 220 on context 0 before context 1. However, in the illustrative embodiment the ordering logic does not ensure that ordered function 2 on context 0 is issued on the functional bus 220 before ordered function 1 on context 1.

If an ordered function is not issued on a context, the ordering logic 210 frees up contexts that follow that context when a context termination function, e.g., an fQueue, fQueueEOF, or fTransmit function, or the above-noted fUnBlockOrderQueues function, is issued on the context. Consider the following example, in which it is assume d that the contexts were assigned in numerical order, i.e., in the order context 0, context 1, context 2:

ordered function 1 on context 1
    ordered function 1 on context 2
    fQueue issued on context 0

The ordering logic 210 receives ordered function 1 on contexts 1 and 2 and holds them, waiting for ordered function 1 to be issued on context 0. When the fQueue function is issued on context 0, the ordering logic issues ordered function 1 on contexts 1 and 2 (in that order) on the functional bus 220. The fQueue function on context 0 basically tells the ordering logic that work on context 0 has been completed and the context is being returned to the free pool. No additional functions will go through the ordering queues on that context until it is reassigned from the pool to a new cell. If an fUnblockOrderQueues function was received on a context, any subsequent functions issued on that context until the context is terminated (e.g., by an fQueue function) are not ordered. Other types of context termination functions may include, e.g., a specific end of function (EOF) function, illustratively denoted fQueueEOF, or a transmit function illustratively denoted fTransmit.

The configuration registers 312 in the set of registers 310 of FIG. 3 may each be configured to define: (1) up to a designated maximum number of functions, e.g., four functions, that will be ordered in an associated one of the ordering queues 302; (2) a number of valid functions that are defined for that queue, e.g., functions 0 to 4; and (3) whether the functions will be ordered on first pass or second pass contexts. Any of a number of suitable formats can be used to store this or other similar information in the configuration registers 312 of the configuration register set 310.

It should again be emphasized that the foregoing description of the operation and configuration of ordering logic 210 and its associated ordering queue set 300 and configuration register set 310 is intended only as an example. Those skilled in the art will recognize that numerous alternative arrangements can be used to implement the invention.

Figure 4:
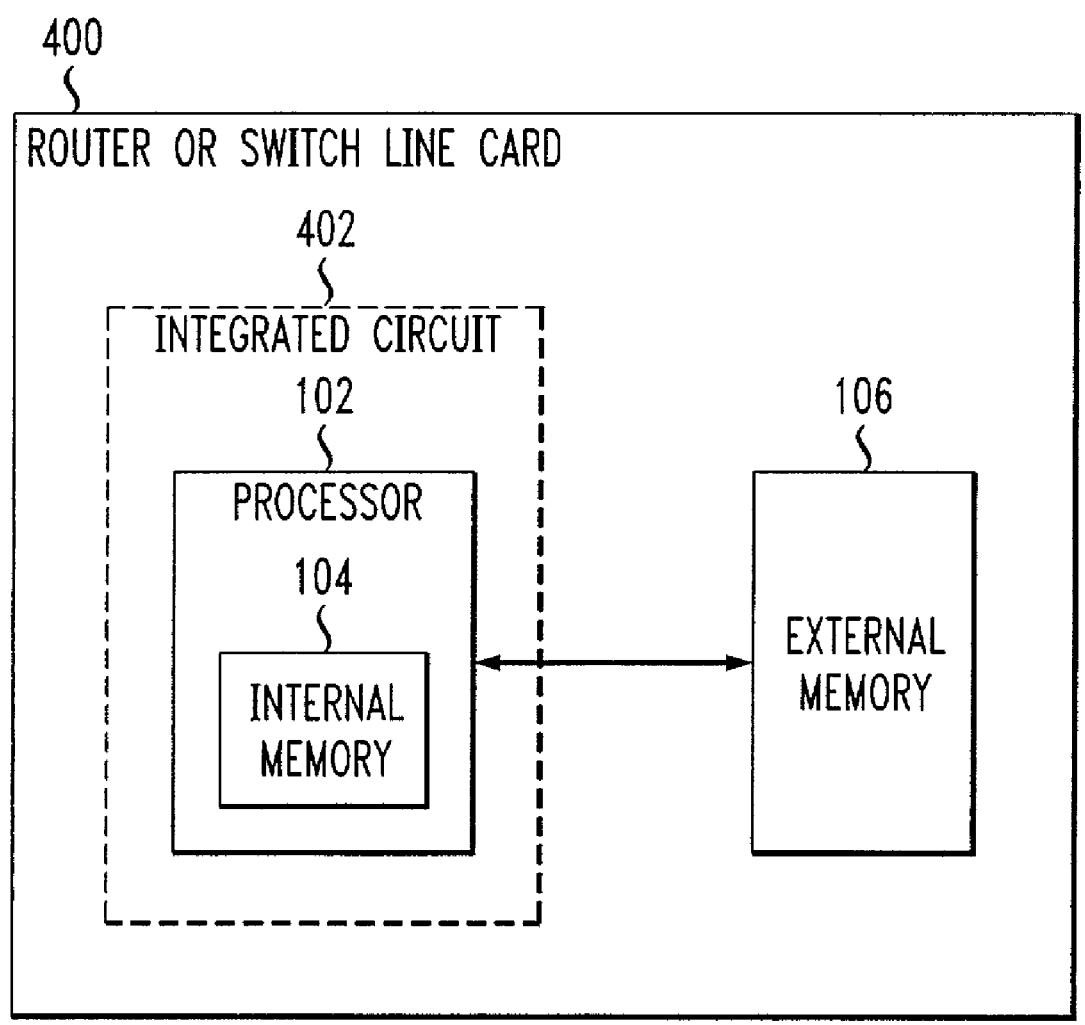
FIG. 4 illustrates one possible implementation of the FIG. 2 network processor as an integrated circuit installed on a line card of a router or switch.

FIG. 4 illustrates an example router or switch line card embodiment of a portion of the system 100 of FIG. 1. In this embodiment, the processing system comprises a line card 400 having at least one integrated circuit 402 installed thereon. The integrated circuit 402 comprises network processor 102 which has internal memory 104. The network processor 102 interacts with external memory 106 on the line card 400. The external memory 106 may serve, e.g., as an external tree memory for the network processor integrated circuit. The above-noted host processor may also be installed on the line card 400.

The portion of the processing system as shown in FIG. 4 is considerably simplified for clarity of illustration. It is to be appreciated, however, that the processing system may comprise a router or switch which includes multiple such line cards, and that each of the line cards may include multiple integrated circuits. A similar embodiment may be implemented in the form of a port card.

The above-described embodiments of the invention are intended to be illustrative only. For example, although the illustrative embodiment of FIG. 2 utilizes separate first pass and second pass classifiers, i.e., first pass classifier 200 and second pass classifier 202, other embodiments may combine the functionality of these elements into a single classification engine, set of classification engines, or other type of classification circuitry. The context identifier based ordering of the present invention can be provided for first pass contexts, second pass contexts or both first and second pass contexts, as well as for other arrangements of single or multiple contexts. The particular control circuitry utilized in the network processor 102 may be varied depending upon the processing arrangements utilized in a given embodiment of the invention. In addition, although the memory 204 is illustratively at least in part internal to the network processor in the embodiments described above, this is by way of example only. Other embodiments can use different types of internal or external memory circuitry configurations for implementing the described functionality. Furthermore, as mentioned previously, the particular classification operations of the classification circuitry can be varied depending upon the processing application, e.g., under software control via a host processor. These and numerous other alternative embodiments within the scope of the following claims will be apparent to those skilled in the art.

What is claimed is:

1. A processor comprising:
classification circuitry operative to identify for each of a plurality of packets received in the processor a corresponding packet flow identifier;
control circuitry operatively coupled to the classification circuitry; and
at least one operational unit operatively coupled to the control circuitry;
wherein the control circuitry is operative to direct one or more packets having a given packet flow identifier to the at least one operational unit and maintains a desired function call sequencing over the one or more packets having the given packet flow identifier for one or more order-dependent processing tasks in the processor;
the control circuitry comprising ordering logic, the ordering logic comprising:
at least one ordering queue storing context identifiers in conjunction with respective function call identifiers and utilizing said context identifiers and said respective function call identifiers to maintain the desired function call sequencing for a designated set of functions;
and at least one configuration register storing information specifying said set of functions that are ordered by the at least one ordering queue.

2. The processor of claim 1 wherein the processor comprises a network processor configured to provide an interface for packet transfer between a network and a switch fabric.

3. The processor of claim 1 wherein the classification circuitry comprises at least one of a first pass classifier and a second pass classifier.

4. The processor of claim 1 wherein the control circuitry comprises at least one of a scheduler and queuing and dispatch logic.

5. The processor of claim 1 wherein the at least one operational unit comprises a plurality of computational units each having one or more execution engines associated therewith.

6. The processor of claim 1 wherein one or more of the packet flow identifiers each translates to a unique memory location in memory circuitry associated with the processor.

7. The processor of claim 6 wherein the unique memory location corresponding to a given packet flow identifier stores at least a counter specifying a number of functions performed for an associated packet flow.

8. The processor of claim 1 wherein the control circuitry is operative to determine if more than one function associated with a particular order-dependent processing task is being performed on multiple packets having the same packet flow identifier during a particular processing interval.

9. The processor of claim 8 wherein if more than one function associated with a particular order-dependent processing task is being performed on multiple packets having the same packet flow identifier during a particular processing interval, the control circuitry maintains the desired function call sequencing for the particular order-dependent processing task.

10. The processor of claim 8 wherein if more than one function associated with a particular order-dependent processing task is not being performed on multiple packets having the same packet flow identifier during a particular processing interval, the control circuitry permits an arbitrary function call sequencing for the particular order-dependent processing task.

11. The processor of claim 1 wherein the packet flow identifier for the given packet is extracted from a header of the packet.

12. The processor of claim 1 wherein each of the received packets has a context identifier assigned thereto within the processor prior to function call issuance for that packet.

13. The processor of claim 12 wherein the context identifiers are selected from a fixed number of tokens.

14. The processor of claim 13 wherein the fixed number of tokens comprises approximately 256 tokens, the context identifier comprising an 8-bit identifier.

15. The processor of claim 12 wherein a given set of packets having the same packet flow identifier have different context identifiers assigned thereto.

16. The processor of claim 12 wherein the context identifiers assigned to the received packets are utilized to maintain the desired function call sequencing for the received packets associated with a particular packet flow identifier.

17. The processor of claim 1 wherein the processor is configured as an integrated circuit.

18. A method for use in processing packets in a processor, the method comprising the steps of:

identifying, in classification circuitry, for each of a plurality of packets received in the processor a corresponding packet flow identifier; and directing, in control circuitry, one or more packets having a given packet flow identifier to at least one operational unit of the processor and maintaining a desired function call sequencing over the one or more packets having the given packet flow identifier for one or more order-dependent processing tasks in the processor;

wherein at least one ordering queue, in the control circuitry, stores context identifiers in conjunction with respective function call identifiers and utilizes said context identifiers and said respective function call identifiers to maintain the desired function call sequencing for a designated set of functions; and at least one configuration register, in the control circuitry, stores information specifying said set of functions that are ordered by the at least one ordering queue.

* * * * *